United States Patent
Bai et al.

(10) Patent No.: US 11,546,046 B2
(45) Date of Patent: Jan. 3, 2023

(54) ENHANCEMENT FOR AMPLIFY-AND-FORWARD RELAY

(71) Applicant: QUALCOMM Incorporated, San Diego, CA (US)

(72) Inventors: Tianyang Bai, Somerville, NJ (US); Juergen Cezanne, Ocean Township, NJ (US); Vasanthan Raghavan, West Windsor Township, NJ (US); Jung Ho Ryu, Fort Lee, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 17/006,300

(22) Filed: Aug. 28, 2020

(65) Prior Publication Data

US 2021/0143894 A1 May 13, 2021

Related U.S. Application Data

(60) Provisional application No. 62/935,039, filed on Nov. 13, 2019.

(51) Int. Cl.
  *H04B 7/155* (2006.01)
  *H04L 25/03* (2006.01)
(52) U.S. Cl.
  CPC ........... *H04B 7/15528* (2013.01); *H04L 25/03159* (2013.01); *H04L 2025/03541* (2013.01); *H04L 2025/03783* (2013.01)
(58) Field of Classification Search
  CPC .............................................. H04B 7/15528
  (Continued)

(56) References Cited

U.S. PATENT DOCUMENTS

| | | | |
|---|---|---|---|
| 2005/0185573 A1* | 8/2005 | Albean | H04L 25/03159 370/206 |
| 2009/0116600 A1* | 5/2009 | Muthu-Manivannan | H04B 3/54 375/371 |
| 2011/0007784 A1* | 1/2011 | Nakamura | H04B 7/2606 375/211 |

(Continued)

FOREIGN PATENT DOCUMENTS

WO  2007086123 A1  8/2007

OTHER PUBLICATIONS

Gao X., et al., "A Two-Hop Equalize-and-Forward Relay Scheme in OFDM-Based Wireless Networks Over Multipath Channels: Equalize-and-Forward Relay for OFDM-Based Wireless Networks", Wireless Communications and Mobile Computing, vol. 16, No. 7, Jan. 13, 2015 (Jan. 13, 2015), pp. 778-793, XP55754370, ISSN: 1530-8669, DOI: 10.1002/wcm. 2569 Abstract Paragraph [01.1] Paragraph [01.3] p. 781, Left-Hand Column Figure 3 Paragraph [0004] Paragraph [04.1].

(Continued)

*Primary Examiner* — Lihong Yu
(74) *Attorney, Agent, or Firm* — Procopio, Cory, Hargreaves & Savitch LLP

(57) ABSTRACT

Systems, apparatuses, and methods for enhancement for amplify-and-forward relay. Instead of merely passing received signal from a source, relay may equalize the received signal based on reference signal contained in the received signal, before amplifying and transmitting the signal to a destination. Compared to amplify-and-forward, equalize-and-forward may compensate the received source signal for various imperfections such as channel distortions and phase errors, using demodulation reference signal and phase tracking reference signal. The relay may apply Fast (Continued)

Fourier Transform (FFT) to equalize the signal in tone domain.

21 Claims, 13 Drawing Sheets

(58) Field of Classification Search
USPC .......................................................... 375/211
See application file for complete search history.

(56) References Cited

U.S. PATENT DOCUMENTS

| | | | |
|---|---|---|---|
| 2016/0087742 A1* | 3/2016 | Zinevich | H04N 21/4382 370/203 |
| 2016/0219621 A1* | 7/2016 | Kim | H04W 56/0055 |
| 2018/0109409 A1* | 4/2018 | Kobayashi | H04L 27/2662 |
| 2020/0287754 A1* | 9/2020 | Stathakis | H04L 25/0226 |
| 2021/0176670 A1* | 6/2021 | Keskitalo | H04W 24/08 |

OTHER PUBLICATIONS

Interdigital, et al., "On PTRS Design for NR", 3GPP Draft, R1-1714608, PTRS Final, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 26, 2017 (Aug. 26, 2017), XP051328165, 11 pages, Retrieved from the Internet: URL: http://www.3gpp.org/ftp/tsg_ran/WG1_RL1/TSGR1_90/Docs/. [retrieved on Aug. 26, 2017] paragraph [0002].
International Search Report and Written Opinion—PCT/US2020/050436—ISA/EPO—dated Dec. 4, 2020.
Samsung: "Discussion on NR UE EVM", 3GPP Draft, R4-1712264, Discussion on NR UE EVM, 3rd Generation Partnership Project (3GPP), Mobile Competence Centre, 650, Route Des Lucioles, F-06921 Sophia-Antipolis Cedex, France, vol. TSG, RAN, No. Reno, USA, Nov. 27, 2017-Dec/ 1, 2017, Nov. 17, 2017 (Nov. 17, 2017), XP051374009, 4 pages, Retrieved from the Internet: URL: http://www.3gpp.org/ftp/tsg%5Fran/WG4%5FRadio/TSGR4%5F85/Docs/. [retrieved on Nov. 17, 2017] figure 1.

* cited by examiner

ENHANCEMENT FOR AMPLIFY-AND-FORWARD RELAY

PRIORITY CLAIM AND CROSS REFERENCE TO RELATED APPLICATIONS

This application claims the benefit of priority of U.S. Provisional Application No. 62/935,039, entitled "ENHANCEMENT FOR AMPLIFY-AND-FORWARD RELAY" and filed on Nov. 13, 2019, which is hereby expressly incorporated by reference herein in entirety as part of the disclosure of this application.

BACKGROUND

This disclosure relates generally to wireless communication, and more specifically, to techniques for enhancement for amplify-and-forward (AF) relay.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (e.g., Long Term Evolution (LTE) or New Radio (NR)). A wireless multiple-access communication system may include a number of base stations or access network nodes, each simultaneously supporting communication for multiple communication devices, which may be otherwise known as user equipment (UE).

Relay can assist communications between source and destination, especially when the direct link between source and destination may be weak, such as when the direct link has high pass loss. A relay may receive from the source a signal (carrying information for the destination), called "source signal," generate a "relay signal" based on the received source signal, and then transmit the relay signal to the destination.

SUMMARY

Systems, apparatuses, and methods are provided for enhancement for amplify-and-forward relay. Instead of merely passing received signal from a source, relay may equalize the received signal based on reference signal contained in the received signal, before amplifying and transmitting the signal to a destination. Compared to amplify-and-forward, equalize-and-forward may compensate the received source signal for various imperfections such as channel distortions and phase errors, using demodulation reference signal (DMRS) and phase tracking reference signal (PTRS). The relay may apply Fast Fourier Transform (FFT) to equalize the signal in tone domain.

According to an aspect of the present disclosure, a method of wireless communication by a relay is provided. The relay may receive a signal from a source, wherein the signal comprises reference signal (RS) and data. The relay may equalize the signal based on the RS. The relay may amplify the equalized signal. Furthermore, the relay may transmit the amplified signal to a destination.

According to another aspect, a relay is provided. The relay may include a receiver, an equalizer, an amplifier, and a transmitter. The receiver may be configured to receive a signal from a source, wherein the signal comprises reference signal (RS) and data. The equalizer may be configured to equalize the signal based on the RS. The amplifier may be configured to amplify the equalized signal. The transmitter may be configured to transmit the amplified signal to a destination.

According to an aspect, an apparatus of wireless communication is provided. The apparatus may include means for receiving a signal from a source, wherein the signal comprises reference signal (RS) and data. The apparatus may also include means for equalizing the signal based on the RS. The apparatus may include means for amplifying the equalized signal. Furthermore, the apparatus may include means for transmitting the amplified signal to a destination.

According to an aspect, a non-transitory computer-readable medium is provided having instructions stored thereon. The instructions may include codes executable for a relay to perform receiving a signal from a source, wherein the signal comprises reference signal (RS) and data. The instructions may also include codes for equalizing the signal based on the RS. The instructions may include codes for amplifying the equalized signal. Furthermore, the instructions may include codes for transmitting the amplified signal to a destination.

From various aspects, a configuration of the RS may be received from the source. A channel or a phase may be estimated based on the RS.

From various aspects, equalizing the signal may include applying Fast Fourier Transform (FFT) to the signal to generate tone symbols. According to a further aspect, the tone symbols may be equalized based on the RS and Inverse FFT may be applied to the equalized tone symbols. According to another further aspect, Inverse Discrete Fourier Transform (IDFT) may be applied to a subset of tone symbols to extract RS samples, phase drift may be estimated based on the RS samples, and the signal may be phase-compensated based on the estimated phase drift.

From various aspects, equalizing the signal may include filtering the signal by an analysis filter bank based on a Discrete Fourier Transform (DFT) matrix; adjusting the filtered signal by weights based on the RS; and synthesizing the adjusted filtered signal by an synthesis filter bank based on an Inverse DFT matrix corresponding to the analysis filter bank.

From various aspects, the signal may be equalized without demodulation or decoding of the data.

From various aspects, it may be determined whether to equalize the signal based on one or more parameters. According to an aspect, the one or more parameters may include a first carrier frequency offset between the source and the relay; and a second carrier frequency offset between the relay and the destination.

Various features and advantages of this disclosure are described in further details below. Other features will be apparent from the description, drawings, and/or the claims.

BRIEF DESCRIPTION OF THE DRAWINGS

Illustrative and non-limiting drawings are provided to aid in the description of various aspects and implementations. Unless specified otherwise, like reference symbols indicate like elements.

DETAILED DESCRIPTION

Traditionally two general relay schemes, amplify-and-forward (AF) and decode-and-forward (DF), may be employed by a relay. In amplify-and-forward, the relay may receive a source signal from the source, amplify the received source signal, and forward it to the destination. But in decode-and-forward, the relay may decode user data from the received source signal, re-encode/re-generate a duplicate version of the source signal based on the decoded user data, and transmit the resulting relay signal to the destination. Although potentially offering better performance over AF, DF can be cost/complexity prohibitive in many practical applications. In particular, millimeter-wave relays may not afford the full decoding cost, delay, or complexity associated with decode-and-forward. On the other hand, many existing millimeter-wave relays are repeaters that amplify and forward received signal, whose performance may be limited by potential degradation in signal quality of the received source signal. Thus, improvements are sought, as disclosed herein, to enhance the amplify-and-forward relay without the costly data demodulation and decoding.

Aspects of the disclosure introduced above are described below in the context of a wireless communication system. Illustrative and non-limiting examples of designs and techniques supporting enhancement for amplify-and-forward relay are then described. Aspects of the disclosure are illustrated by and described with reference to various apparatus diagrams, system diagrams, and flowcharts.

Figure 1:
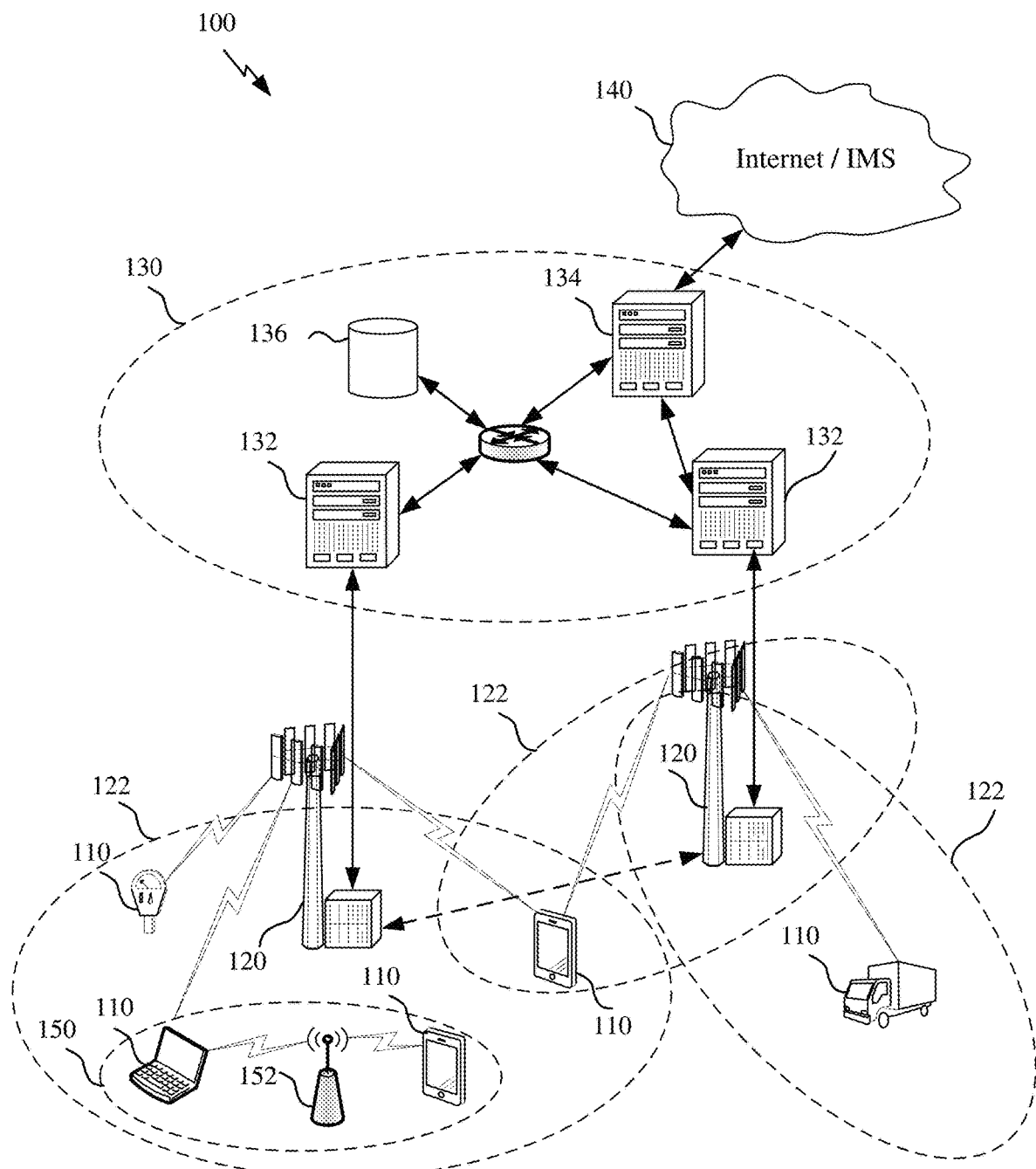
FIG. 1 illustrates an example of a wireless communication system in accordance with the present disclosure.

FIG. 1 illustrates an example of a wireless communication system 100 in accordance with the present disclosure. The wireless communication system 100 generally include user devices (e.g., UEs 110) and network devices (e.g., base stations 120 and entities of a core network 130). Examples of the wireless communication system 100 may include various wireless network technologies, such as LTE or NR, as developed and standardized by the Third Generation Partnership Project (3GPP).

A user equipment generally refers to a device (e.g., of an end-user) that utilizes wireless communication service provided by a wireless communication network. As illustrated, a UE 110 may take a variety of forms, such as a cellphone, a computation device, a machine-type-communication (MTC) or Internet-of-Things (IoT) device, or a vehicular device, and so on. UEs 110 may be dispersed throughout the wireless communication system 100, and each UE 110 may be stationary or mobile. As used herein, a "user equipment" may also be referred to as a subscriber station, an access terminal, a remote terminal, a handset, a user device, or generally a wireless communication device or some other suitable terminology in the context.

A base station generally refers to a network device that communicates wirelessly (e.g., via over-the-air radio channel) with user devices. Base stations 120 may communicate with one another and/or with the core network 130, e.g., through backhaul links or other network nodes. Base stations 120 often serve as entry points for a user equipment to access communication services provided by a wireless communication network. Base stations 120 (and in some examples, with other entities) may constitute a radio access network (RAN), which connects UEs 110 to the core network 130 via certain radio access technology (RAT), such as LTE or NR. In 3GPP context, a base station may be known as an evolved Node B (eNB) for LTE or a next generation Node B (gNB) for NR. But generally, as used herein, a "base station" may also be referred to as a base transceiver station, a radio base station, an access point, or some other suitable terminology in the context.

In general, a base station 120 may communicate with a UE 110 using communication resources in time, frequency, and/or space. Communication may occur in two directions: "downlink" (or "forward link") from the base station 120 to the UE 110; or in reverse, "uplink" (or "reverse link") from the UE 110 to the base station 120. Downlink and uplink transmissions may take place on same or different frequency bands and during same or different time instances. In terms of time resources, time intervals of transmission may be organized according to a "frame" structure. A frame may further be divided into a number of subframes or slots, each further containing a number of symbols, and so on. In terms of frequency resources, a variety of frequency bands (e.g., ranging from ultra-high frequency to extremely-high frequency) may be used. The frequency bands may be "licensed" (e.g., to an operator exclusively), or "unlicensed" (or "shared") (e.g., shared by general users subject to interference and coexistence regulation). On a frequency band, a "carrier" may generally refer to a set of radio frequency spectrum resources supporting uplink and/or downlink communication, such as transmission of physical signals or channels. In some examples a carrier may be made up of multiple sub-carriers (e.g., waveform signals of multiple different frequencies). In terms of spatial resources, base stations 120 and/or UEs 110 may communicate on one or more (physical or virtual) antenna ports, for instance, based on various single-user or multi-user, Multiple-Input and Multiple Output (MIMO) techniques, such as spatial diversity, multiplexing, or beamforming, and so on. Multiple antennas may be co-located or distributed in diverse geographic locations.

A base station 120 may operate one or more "cells" 122. The term "cell" generally refers to a logical entity used for communication with a base station (e.g., over one or more carriers), and in some context, may also refer to a portion of a geographic coverage area (e.g., a sector) over which the logical entity operates. An identifier (e.g., a cell identity) may be associated with a cell to distinguish the cell from another cell. A UE 110 may register and communicate with one or more cells 122 (e.g., serving cells) while monitoring other cells 122 (e.g., neighbor cells).

The core network 130 may include a network of entities providing user authentication, voice/multimedia communications, Internet Protocol (IP) connectivity, and/or other application services. These entities may be referred to as nodes, servers, gateways, functions, or other suitable terminologies. Examples of the core network 130 may include an evolved packet core (EPC) in a LTE network, a 5G Core (5GC) in a 5G or NR network, or generally, other packet based network architecture. The core network 130, such as in 5GC, may separate user plane function from control plane function into different entities. The user plane generally handles transfer of user data, whereas the control plane exchange of network control information. A base station 120 in a radio access network may communicate with an entity 132 to access services of the core network 130. The entity 132 may incorporate a mobility management entity (MME) and/or a serving gateway (SGW), as in EPC, to implement control plane and/or user plane protocols. In other examples, the entity 132 may represent separate control plane or user plane functions, such as a core access and mobility management function (AMF) and/or a user plane function (UPF) in 5GC. The MME or AMF may provide control plane functionalities such as mobility, authentication, and/or bearer management for UEs 110 served by the base station 120. User data may be routed by the entity 132 through another entity 134, such as a PDN gateway (PGW) of EPC or a UPF of 5GC, connected to a packet data network (PDN) 140. The entity 134 may transport IP packets between the PDN 140 and a UE 110 accessing the PDN 140 via a base station 120 and the core network 130. The entity 134 may also provide IP address allocation as well as other functions. The core network 130 may also include other entities. Subscriber information or user profile may be stored in a server 136, such as a home subscriber server (HSS), which may be queried, e.g., for user authentication, registration, or billing, etc.

In general, a packet data network may be any packet (e.g., IP) based network. A UE 110 may communicate with the PDN 140 for a variety of applications or services. Examples of the PDN 140 may include an operator's service network, an IP Multimedia Subsystem (IMS), or generally the Internet. The IMS may provide voice, video, or other multimedia applications, such as voice over IP (VoIP) call, across various types of communication networks.

The wireless communication system 100 may represent a packet-based network that operates according to various layered protocol stacks. Multiple protocol layers (or sublayers) may reside in a UE 110, a base station 120, and an entity of a core network 130. In the user plane, a Packet Data Convergence Protocol (PDCP) layer, with counterparts residing in a UE 110 and a base station 120, may provide wireless communication service for user data via data radio bearers (DRBs). Below PDCP may sit a Radio Link Control (RLC) layer, followed by a Medium Access Control (MAC) layer, and lastly by a Physical (PHY) layer, with counterparts residing in the UE 110 and the base station 120. In some examples (such as in NR), a Service Data Adaptation Protocol (SDAP) layer may be interfaced between an upper protocol stack (e.g., IP) and the PDCP to handle mapping between quality of service (QoS) flows and data radio bearers. The SDAP, PDCP, RLC, and MAC layer may correspond to sublayers of "Layer 2" (or Data Link Layer) in terms of Open Systems Interconnection (OSI) model, and the PHY layer the "Layer 1" (or Physical Layer). The SDAP layer may map between a QoS flow and a data radio bearer (DRB) and may also perform other QoS related operations. The PDCP layer may handle transfer of user data, header compression, in-sequence delivery, duplication detection, etc. The RLC layer may perform transfer of upper layer PDUs according to transmission modes, error correction through automatic repeat request (ARQ), segmentation/concatenation, etc. The MAC layer may handle multiplexing of logical channels into transport channels and may schedule uplink/downlink transmission or reception at the PHY layer. The MAC may also use hybrid automatic repeat request (HARQ) to provide retransmission at the MAC layer to improve link efficiency. The PHY layer may transmit information from MAC transport channels over the air interface. The PHY layer may also handle various aspects of power control, link adaptation, cell search, etc.

In the control plane, at a UE 110, an Non-Access Stratum (NAS) layer may lie on top of a Radio Resource Control (RRC) layer. The NAS layer may handle connection or session management between the UE 110 and a core network 130, whereas the RRC layer may handle radio resource management between the UE 110 and a base station 120. The RRC layer may correspond to "Layer 3" (or Network Layer) in the OSI model. The RRC layer may perform RRC connection management (including establishment, configuration, maintenance, and/or release) between the UE 110 and the base station 120, data and signaling radio bearer management, system information broadcast, mobility management, etc. In addition, the RRC layer may encapsulate and pass NAS messages between the UE 110 and the core network 130. For a respective peer layer (RRC or NAS) at the UE 110, a counterpart RRC layer may reside in the base station 120 and a counterpart NAS layer in an entity of the core network 130 (e.g., entity 132). Below the RRC, a PDCP layer may transfer NAS/RRC messages via signaling radio bearers (SRBs). Similar to the user plane, the PDCP may then be followed by RLC, MAC, and PHY, as generally described above with respect to the user plane.

The protocol stacks can provide for a variety of channels of communications. A set of "logic channels" may be provided for user and control data transfer between an RLC layer and a MAC layer; a set of "transport channels" between a MAC layer and a PHY layer; a set of "physical channels" may carry physical layer data and/or signals over the wireless medium (e.g., over the air interface) between a UE 110 and a base station 120. Generally speaking, a layer may receive, as an input, a service data unit (SDU) from a layer above, generate one or more protocol data units (PDUs), e.g., by adding headers to the received SDU, and pass the generated PDUs to a layer below for further processing.

Besides communicating with a wireless wide area network (WWAN), a UE 110 may communicate with a wireless local area network (WLAN), such as a Wireless-Fidelity (Wi-Fi) network. A WLAN 150 may include a wireless access point (AP), such as a wireless "hotspot" or "router" coupled to the Internet. A user device served by a wireless access point may also be referred to as an access terminal (AT). An AP 152 may wirelessly communicate with a UE 110 and may relay packetized communication data (e.g., IP packets) between the UE 110 and the Internet (or another AT). A WWAN (e.g., the core network 130) may support inter-networking (including aggregation) with a WLAN, and a UE 110 may communicate with both a base station 120 and an AP 152.

For illustrative purposes, the following examples and figures may be described with reference to the user or network devices of FIG. 1; however, other types of user or network devices may be used in same or other examples without limiting the scope of the present disclosure.

Figure 2:
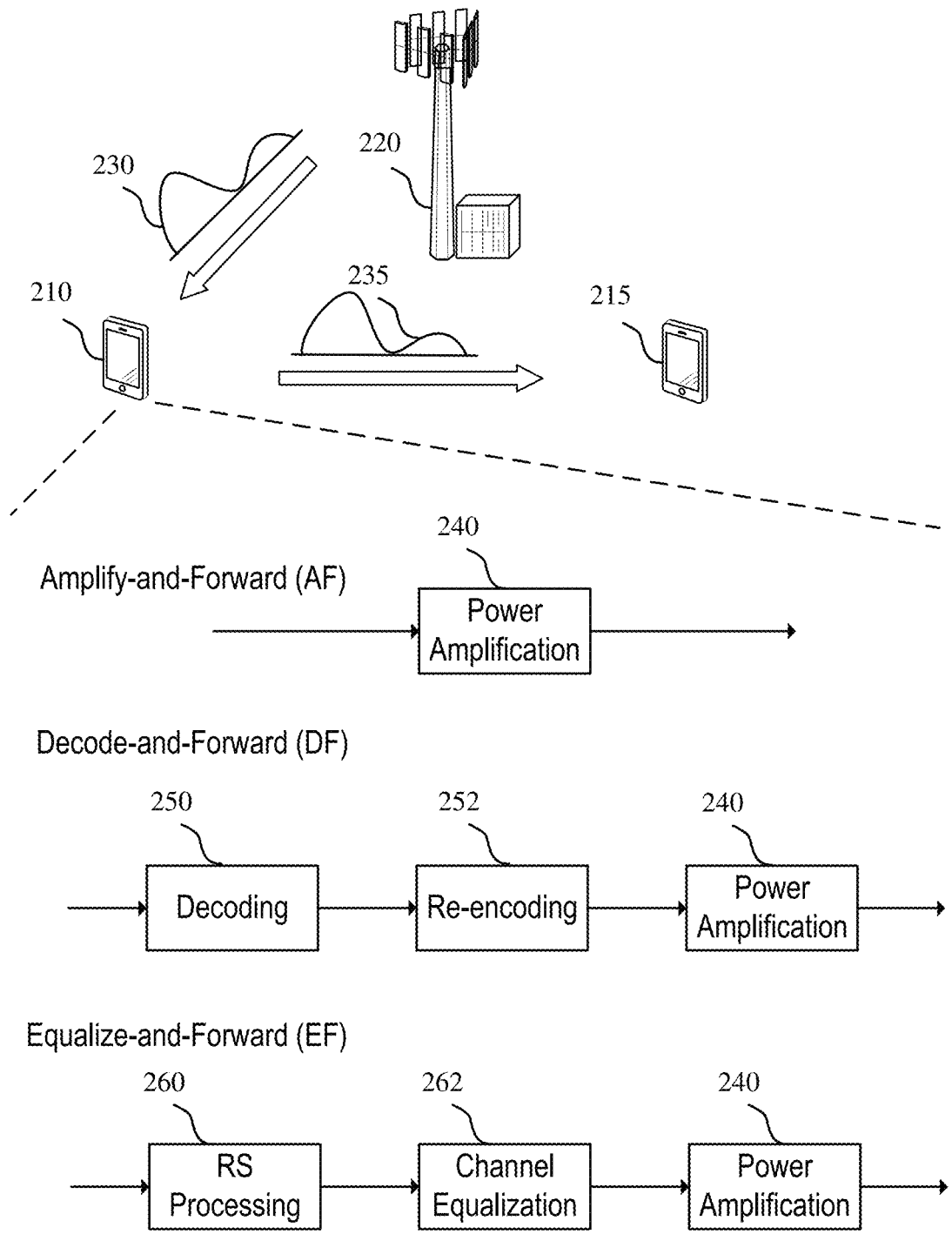
FIG. 2 illustrates an example of three-node relay communications in accordance with the present disclosure.

FIG. 2 illustrates an example of three-node relay communications in accordance with the present disclosure. A relay 210 receives a source signal 230 (or message, packet, etc.) from a source 220 and transmits a relay signal 235 to a destination 215. The relay signal 235 may be viewed as a "replica" of the source signal 230, relaying information from the source 220 to the destination 215. In general, the source 220, the relay 210, and the destination 215 are wireless communication devices, such as UE 110 or base station 120 described in FIG. 1. According to an aspect, the source 220 may be a base station 120, and the relay 210 may be a UE 110 (or a relay device) relaying signals to a second UE, the destination 215. Not shown in the figure, the source and the destination may be reversed such that the relay 210 may also relay signals from the second UE to the base station.

In amplify-and-forward, the relay may receive a source signal from the source, amplify the received source signal, and forward it to the destination. The received source signal may go through power amplification 240, such as being multiplied with a scale coefficient. Since the relay merely amplifies the signal, a major advantage of the AF scheme lies in its low complexity, and in certain conditions, AF scheme may yield adequate performance when the relay can receive the source signal in good quality or channel condition. A drawback of the AF scheme, on the other hand, is the lack of noise or distortion compensation: the power amplification 240 may amplify the noise/distortion (as well as the desired signal) present in the received source signal. When the channel between the source and the relay becomes more noisy, resulting in a degradation in the signal to noise ratio (SNR) of the received source signal, the power amplification 240 may not improve the SNR of the relay signal 235. The lack of SNR enhancement in the relay signal 235 could limit overall performance even if the channel between the relay and the destination is lossless.

Decode-and-forward may overcome the aforementioned performance bottleneck of amplify-and-forward, albeit with significantly increased complexity. In DF, the relay decodes user data from the (potentially noisy or distorted) received source signal, reconstructs the source signal to generate a relay signal from the decoded user data, and forwards it to the destination. The received source signal may go through decoding 250, re-encoding 252, and then power amplification 240. During decoding 250, the relay may demodulate and decode the received source signal to generate source information bits (or data packet). Despite the presence of noise or distortion in the received source signal, the relay may reliably decode the source information bits in certain conditions, such as when user data are sufficiently protected by error correction codes against channel noise and distortion. During re-encoding 252, the relay may re-encode/modulate the decoded source information bits to reconstruct a less-noisy, or even noise-free, replica of the source signal 230. The resulting relay signal may then be power-amplified and transmitted to the destination. Since the decoding/re-encoding relies on detailed knowledge about the modulation and coding schemes used by the source, the DF scheme also demands a much closer collaboration among the nodes than the AF scheme. The high cost and complexity of DF may negate its denoise gain over AF and render it impractical in some applications.

As described herein, amplify-and-forward can be enhanced without the substantial or full cost of decode-and-forward. Unlike AF which is largely indifferent to the intrinsic structure of the source signal, the enhanced AF exploits various structural aspects of the source signal to improve quality of the relay signal generated from the source signal, but does so without demodulating and decoding the source signal as would be in DF. One such structural characteristics of a source signal is that besides data, the source signal may contain or be associated with reference signal (RS). The term "reference signal" generally refers to a known signal, from the viewpoints of a receiver, that aids the receiver's estimations of channel, interference, noise, or other parameters. Using RS, a relay may equalize a received source signal (e.g., to enhance its SNR) before forwarding it to the destination. As used herein, the RS-based, enhanced AF scheme is also called "equalize-and-forward" (EF).

In EF, the received source signal may go through RS processing 260, channel equalization 262, and then power amplification 240. The RS processing 260 may estimate the amount or extent of channel transformation or phase rotation experienced by the source signal 230 as it travels from the source to the relay. Based on the estimated channel, the channel equalization 262 may equalize (or "undo") the effects of channel and produce an equalized signal having higher quality than the received source signal. Like DF, EF may enhance SNR, but unlike DF, EF does not demodulate/decode data from the received source signal. The absence of data demodulation and decoding can bring significant savings in complexity and cost. Moreover, EF may operate under a limited knowledge of the source signal; the relay need not know the detailed modulation and coding schemes of the source data packets, and likely some limited information about the presence/configuration of the RS in the source signal may suffice.

As further elaborated below, equalize-and-forward can exploit waveform structures of the source signal to efficiently equalize the received source signal. The source signal may be an orthogonal frequency division multiple access (OFDM) waveform, or may be a single-carrier waveform. The single-carrier waveform may be based on Discrete Fourier Transform (DFT) spread OFDM (DFT-s-OFDM), also known as single carrier frequency division multiple access (SC-FDMA) or single carrier frequency division multiplex (SC-FDM). The RS processing 260 and channel equalization 262 may be adapted to the particular waveform of the source signal. Furthermore, a relay may determine conditions under which EF may be more advantageous than AF (or DF), or vice versa, and may optimize the use of a particular relay scheme depending on the determination.

Figure 3:
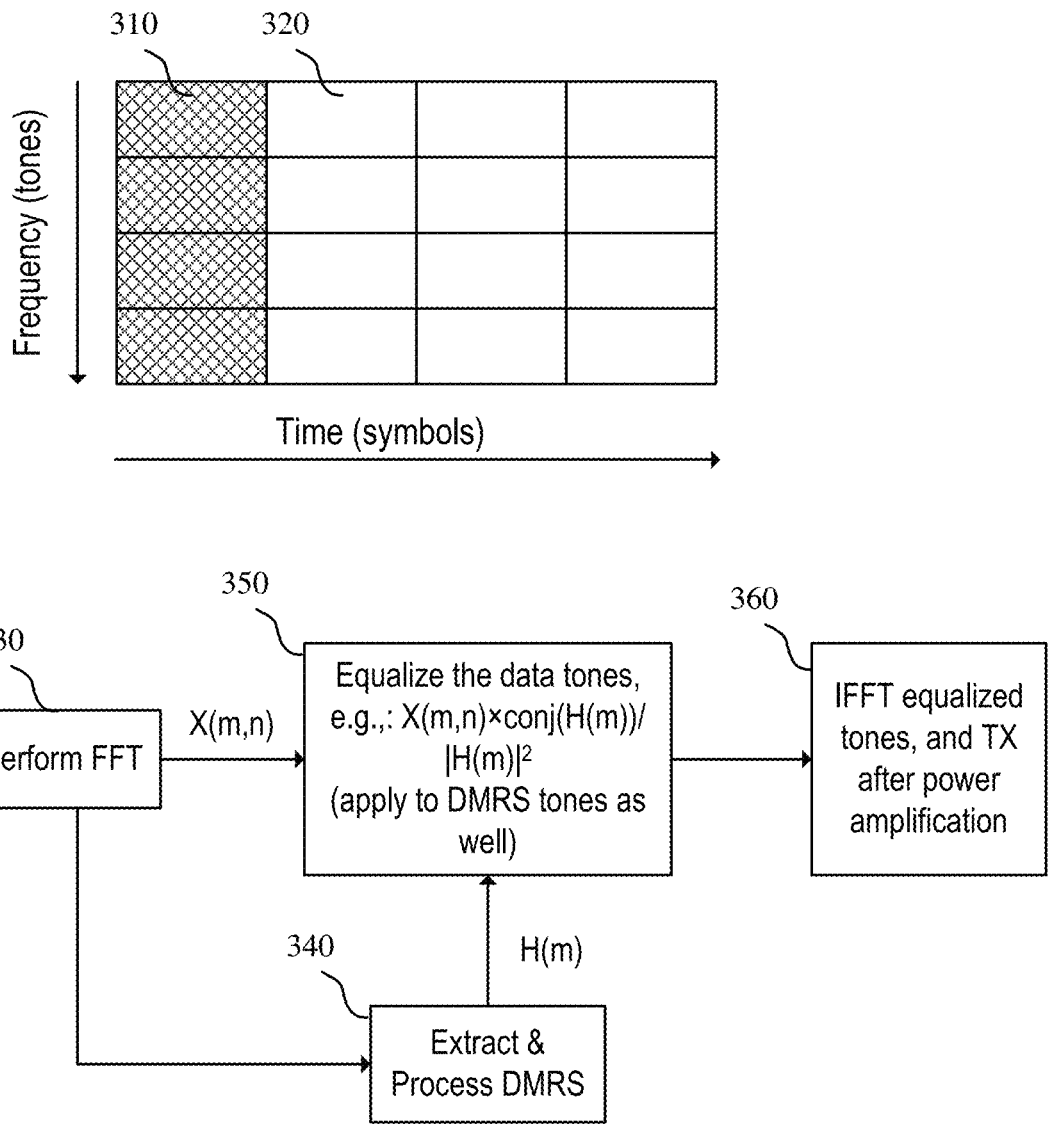
FIG. 3 illustrates an example of DMRS processing for OFDM waveforms in accordance with the present disclosure.

FIG. 3 illustrates an example of DMRS processing for OFDM waveforms in accordance with the present disclosure. Demodulation RS (DMRS) is a type of RS than aids channel estimation for demodulation of data. An OFDM source signal may contain DMRS and data arranged in certain patterns on time (symbol) and/or frequency (tone) locations. For illustrative purposes, DMRS tones 310 are shown occupying a first OFDM symbol, followed by data tones 320 in the next three OFDM symbols. Depending on the multiplexing patterns of DMRS or data, each tone in the time-frequency resource grid may carry a DMRS or data tone symbol.

In equalize-and-forward, a relay may perform Fast Fourier Transform (FFT) 330 on OFDM symbols of a received source signal. The FFT can efficiently decompose the received source signal into time-frequency domain for further processing. The tone symbol may be denoted as X(m,n) with m being the tone index and n the symbol index. Based on the knowledge of DMRS tone locations, the DMRS tone symbols may be extracted and processed, at 340, to produce channel estimate, denoted by H(m), for equalization at tone m. At 350, data tones may be equalized. In one aspect, the received data tone is adjusted in phase and amplitude based on the corresponding channel estimate: $Y(m,n)=X(m,n)\times \text{conj}(H(m))/|H(m)|^2$, where "conj" denotes a conjugate of a complex number; in particular, a received tone X(m,n) is multiplied with the conjugate of the corresponding channel estimate H(m). The DMRS tones are similarly equalized as the data tones. Notice that the data symbols are not demodulated nor decoded; rather a tone-dependent scaling is applied to the data tones. After equalization, at 360, the relay may apply an Inverse FFT (IFFT) to the equalized tone symbols to generate OFDM waveform in time domain. Afterwards, the relay may power-amplify the equalized signal and transmit it to the destination. The frequency-domain equalization may effectively mitigate distortions of the received source signal, e.g., caused by multipath delay or frequency selective fading on the channel between the source and the relay, and thus in EF, the relay may produce a relay signal with less channel distortion than in AF.

Figure 4:
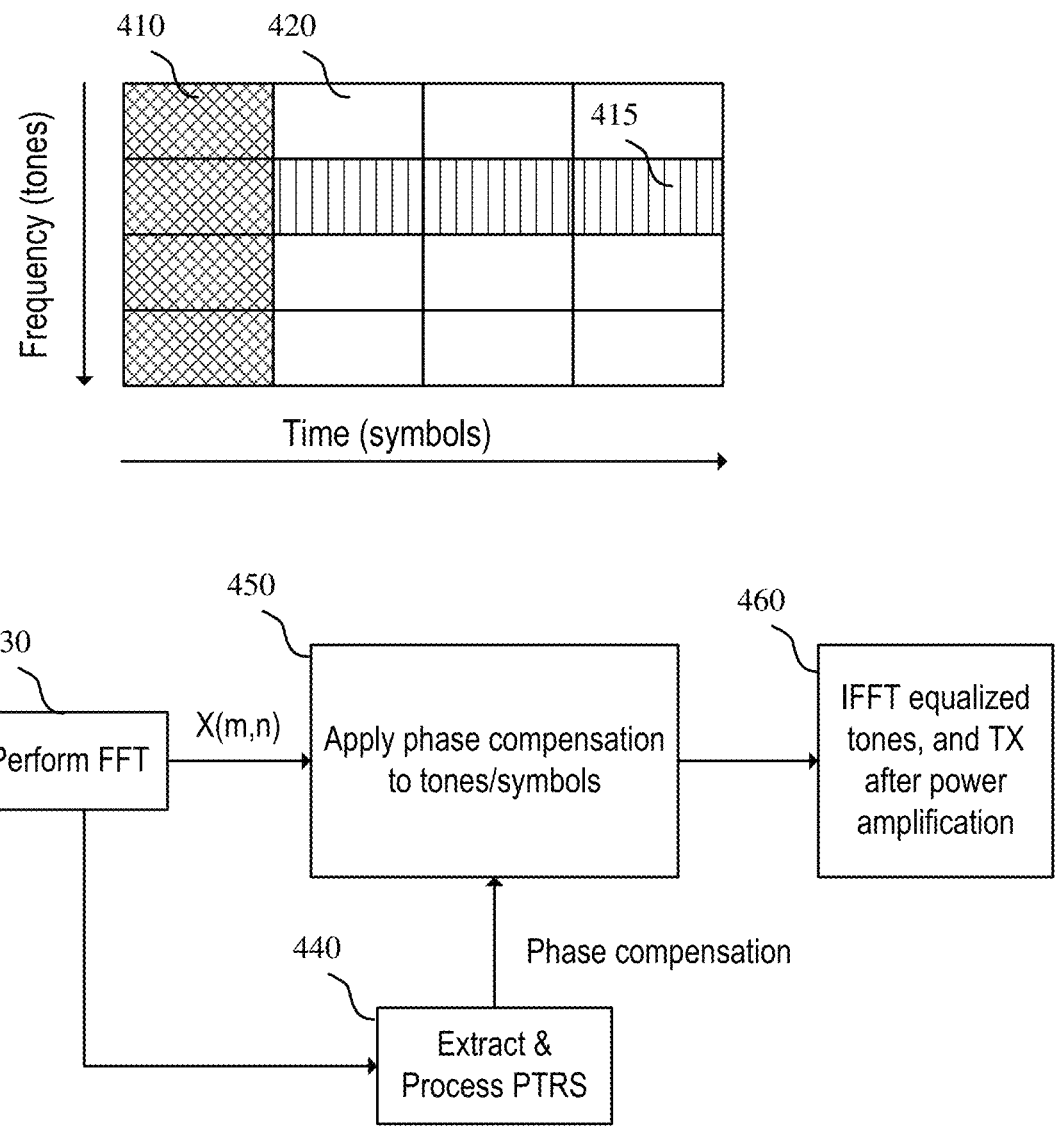
FIG. 4 illustrates an example of PTRS processing for OFDM waveforms in accordance with the present disclosure.

FIG. 4 illustrates an example of PTRS processing for OFDM waveforms in accordance with the present disclosure. A phase tracking RS (PTRS) is a type of RS that aids in a receiver's estimation or tracking of phase errors in received signal. PTRS may be used to combat phase noise, especially in millimeter-wave communications where phase noise may cause performance-impacting, random phase rotations in received samples or symbols. As illustrated in FIG. 4, in addition to DMRS tones 410 and data tones 420, PTRS tones 415 may occupy a row of tones (at the second tone location from the top) for every data OFDM symbols.

Similarly to FIG. 3, a relay may perform FFT at 430 to generate (data and RS) tone symbols. At 440, the relay may extract and process PTRS to estimate a phase error, denoted by PE(n), for phase compensation at symbol n. At 450, the relay may phase-compensate the received tone with the estimated phase error. According to an aspect, the received tone is phase de-rotated based on the amount of phase compensation: $Y(m,n)=X(m,n)\times\text{conj}(PE(n))$. Similar phase compensation is performed for data as well as RS tones. After phase compensation, at 460, the relay may apply IFFT to the equalized tones to generate OFDM waveform in time domain. The relay may then power-amplify, and transmit to the destination, the equalized source signal.

Figure 5:
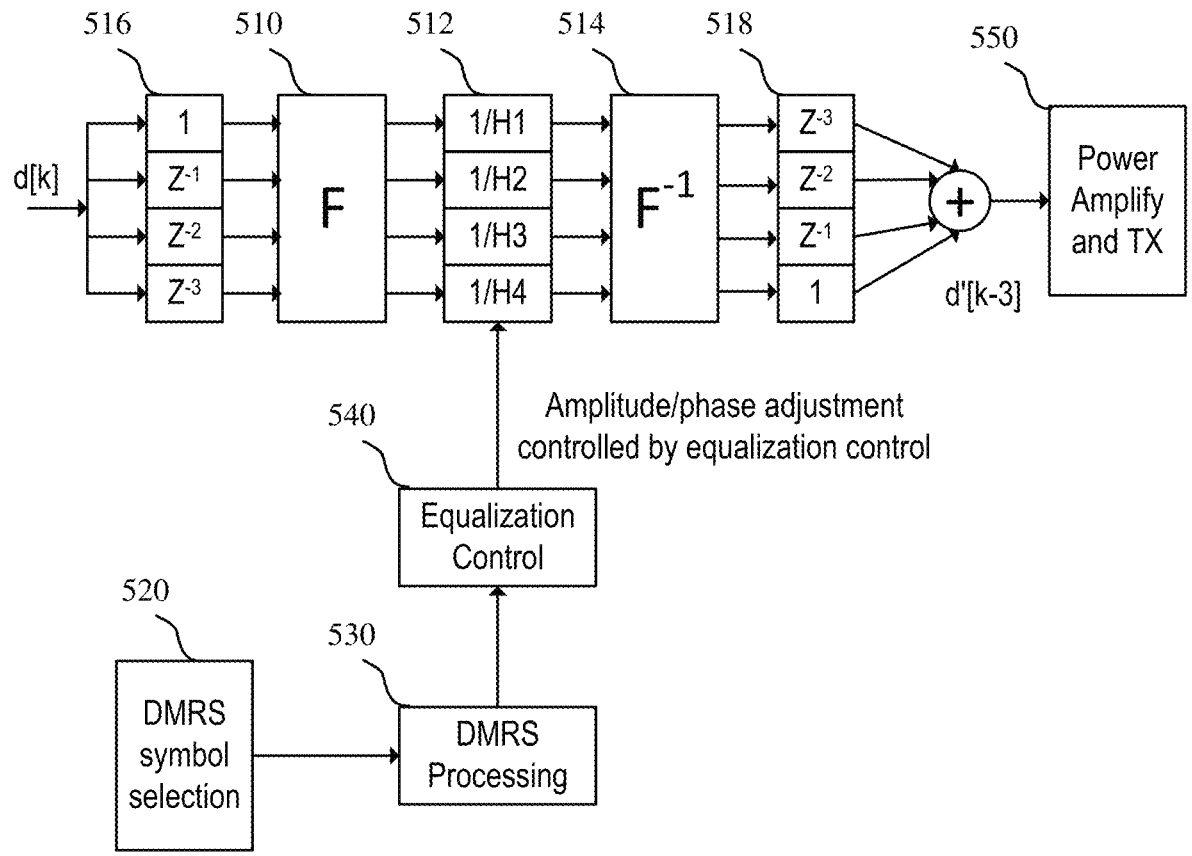
FIG. 5 illustrates an example of filter bank equalization in accordance with the present disclosure.

FIG. 5 illustrates an example of filter bank equalization in accordance with the present disclosure. In EF as described with reference to FIG. 3 and FIG. 4, the FFT is used to convert the received source signal waveform in time domain to an OFDM time-frequency digital (tone-symbol) domain for equalization. To prepare for FFT, a relay may wait until after it buffers all samples of an OFDM symbol. The resulting one-OFDM-symbol delay (with potentially more processing delay) may be too long, compared to the cyclic prefix (CP) length or the channel delay profile. As an alternative to FFT processing, filter banks may help significantly reduce processing delay to the level of channel delay (or CP length), as oppose to OFDM symbol length. Depending on the channel conditions, filter-bank based EF may accomplish small delays as amplify-and-forward.

Instead of FFT and IFFT, the filter-bank based EF may pass time domain samples (denoted as d[k]) of a received source signal through a pair of an analysis filter bank 510 and a corresponding synthesis filter bank 514, which is generally an inverse of the analysis filter bank 510. The analysis filter bank 510 may take a form of Discrete Fourier Transform (DFT) matrix, and correspondingly the synthesis filter bank 514 a corresponding Inverse DFT (IDFT) matrix. As illustrated in the figure, the samples may parallelly pass through delay lines 516, with each delay line progressively inserting one more sample delay. The number of delay lines 516 (including the 0-delay or no-delay line, denoted by "1" in the figure) is the same as the size or dimension of the analysis/synthesis filter bank. The filter-bank dimension controls the maximal processing delay, which may be chosen based on channel delay profile, such as being proportional to channel multipath delay spread. At a time instance, a block of delayed samples may be fed to the analysis filter bank 510 (e.g., being multiplied with the DFT matrix). The outputs of the analysis filter bank 510 may be adjusted by equalization weights 512 in terms of amplitude and/or phase. To convert the filtered samples after analysis back to time domain, The equalized post-analysis samples may be fed to the corresponding synthesis filter bank 514 (e.g., being multiplied with the IDFT matrix) and then parallelly pass through "inverse" delay lines 518 arranged in a reverse order of the delay lines 516. The delay lines 516 and the corresponding delay lines 518 jointly align each delayed path of post-synthesis samples at a common, fixed maximal delay. The outputs of the delay lines 518 may be summed to form the equalized samples in time domain, which may be power-amplified and transmitted to the destination at 550.

The equalization weights 512 may be generated based on reference signal, such as DMRS. Knowing the timing of DMRS, a relay may select DMRS symbols among received symbols at 520. The relay may process the DMRS at 530 and control equalization weights at 540. The DMRS processing 530 may estimate channel based on DMRS, and the equalization control 540 may calculate and update equalization weights 512 based on the estimated channel. In the filter-bank based EF, the equalization weights 512 reflect adjustment in amplitude and/or phase of the post-analysis filter samples. In effect, the adjustment equalizes channel distortion experienced by the received signal. According to an aspect, the DMRS processing 530 may use a similar filter bank structure, except that the relay may, based on known DMRS sequence, compute the amplitude and phase adjustment for the DMRS samples.

Figure 6:
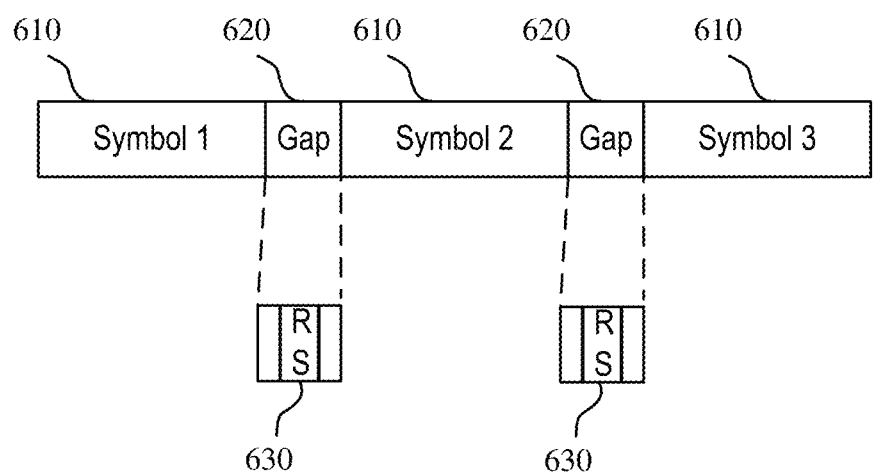
FIG. 6 illustrates an example of reference signal insertions for single-carrier waveforms in accordance with the present disclosure.

FIG. 6 illustrates an example of reference signal insertions for single-carrier waveforms in accordance with the present disclosure. Typically a source signal may contain some reference signal (such as DMRS, PTRS, etc.) along with data, but in some cases, there might arise a need for additional or new RS, such as adding PTRS for phase correction over a pre-exiting signal structure. A source may insert the RS in gap time between symbols of a single-carrier waveform. As illustrated in FIG. 6, a single-carrier source signal may have multiple symbols 610 in time domain. To preserve characteristics of single carrier, a source may insert reference signals 630 during gaps 620 between the symbols 610. Within a gap 620, guard time may be placed around an inserted RS 630. After RS insertion, the source may transmit the RS-inserted, source signal to a relay. The relay may extract RS samples, corresponding to the RS 630, from the received source signal, and may equalize the received source signal based on the RS samples. According to an aspect, the relay may estimate a phase drift between samples based on an inserted RS and apply phase compensation on all samples based on the phase-drift estimation. After phase compensation, the relay may amplify and transmit to a destination the corrected samples.

Figure 7:
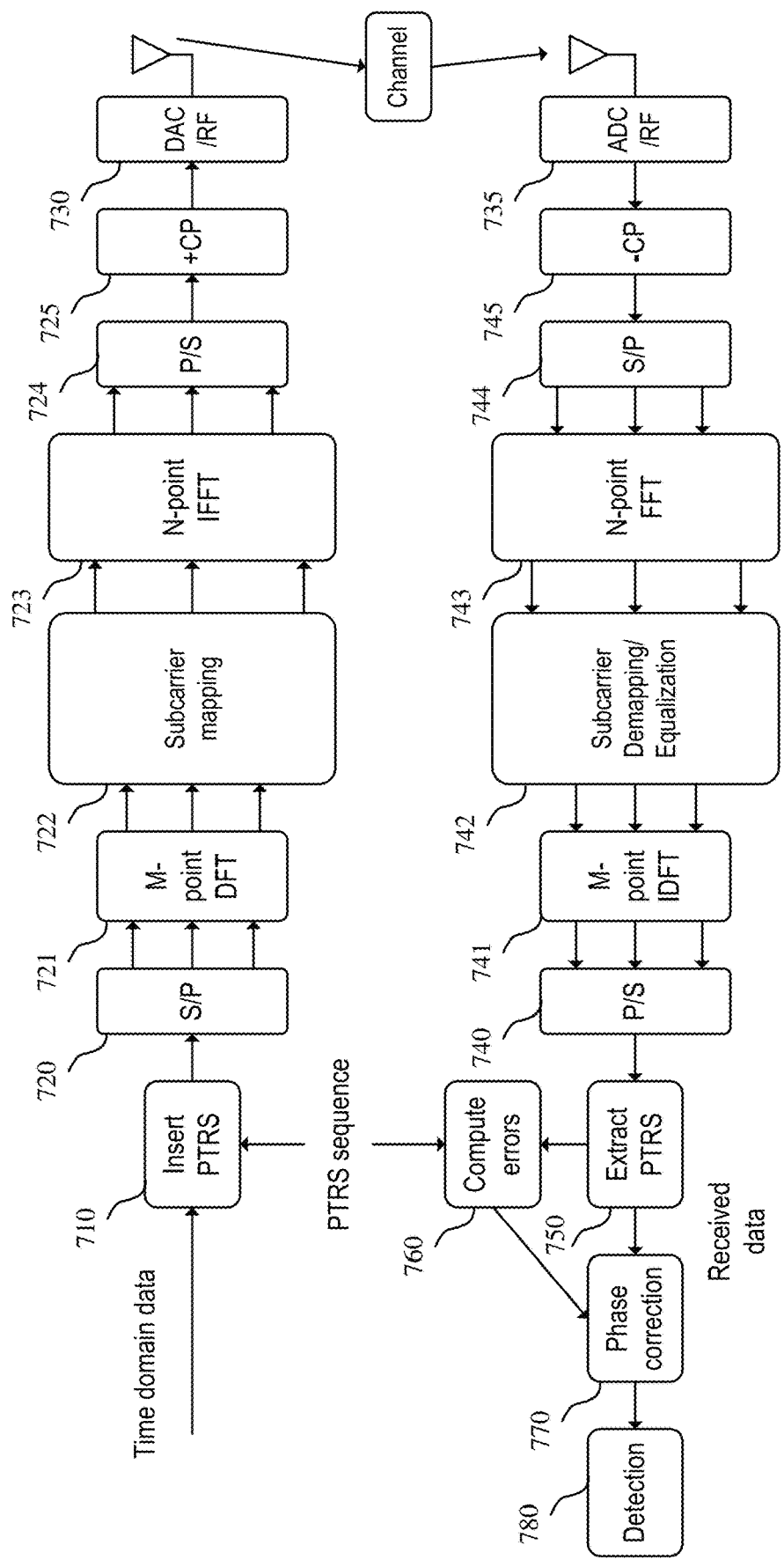
FIG. 7 illustrates an example of PTRS insertion and processing for SC-FDM waveforms in accordance with the present disclosure.

FIG. 7 illustrates an example of PTRS insertion and processing for SC-FDM waveforms in accordance with the present disclosure. An SC-FDM (single-carrier frequency division multiplex) waveform is a type of single-carrier waveform that utilizes FFT (similar to OFDM) for efficient waveform generation and processing. The SC-FDM may also be referred to as SC-FDMA or DFT-s-OFDM (DFT spread OFDM).

At 710, a source may insert PTRS sequence in time domain data samples. Generally the PTRS samples and data samples are time-multiplexed in certain patterns. According to an aspect, the PTRS samples are uniformly distributed: A cluster of PTRS samples is separated from another PTRS cluster by same distance (in the number of data samples in between). The time domain PTRS-and-data samples may be converted to sample vectors after serial-to-parallel (S/P) conversion 720. Each vector contains multiple samples and corresponds to an SC-FDM symbol. The sample vectors may be transformed to frequency domain by M-point Discrete Fourier Transform (DFT) 721, and then at 722, the post-DFT samples may be mapped to multiple subcarriers of a generally larger set of N subcarriers. At 723, the subcarrier-mapped samples may be converted back to time domain via an N-point Inverse Fast Fourier Transform (IFFT) 723. After parallel-to-serial (P/S) conversion 724, a cyclic prefix (CP) may be added for each SC-FDM symbol at 725 to form digital samples of the source signal (with PTRS inserted). The source may transmit the source signal after digital-to-analog conversion (DAC) and radio frequency (RF) processing at 730.

After receiving the source signal from the source over a channel, a receiver (such as a relay) may equalize (or phase-compensate) the received signal based on the PTRS. After analog-to-digital conversion (ADC) and RF processing 735, CP removal 745, and S/P conversion 744, the receiver may transform time-domain sample vectors (corresponding to SC-FDM symbols) to frequency domain via N-point FFT 743. At 742, the receiver may select (or "de-map") a subset of M subcarriers, being occupied by data/PTRS, among the N subcarriers and may equalize the de-mapped samples. The receiver may convert the frequency domain post-FFT samples to time domain via M-point IDFT 741 and P/S conversion 740. At 750, the receiver may extract PTRS samples to compute phase errors at 760. Based on the estimated phase error, the receiver may phase-compensate 770 the received signal samples (such as data samples). The phase-corrected data samples may be further processed by detection 780 for data. If the receiver is a relay, the data processing (e.g., detection 780) may be skipped.

Figure 8A:
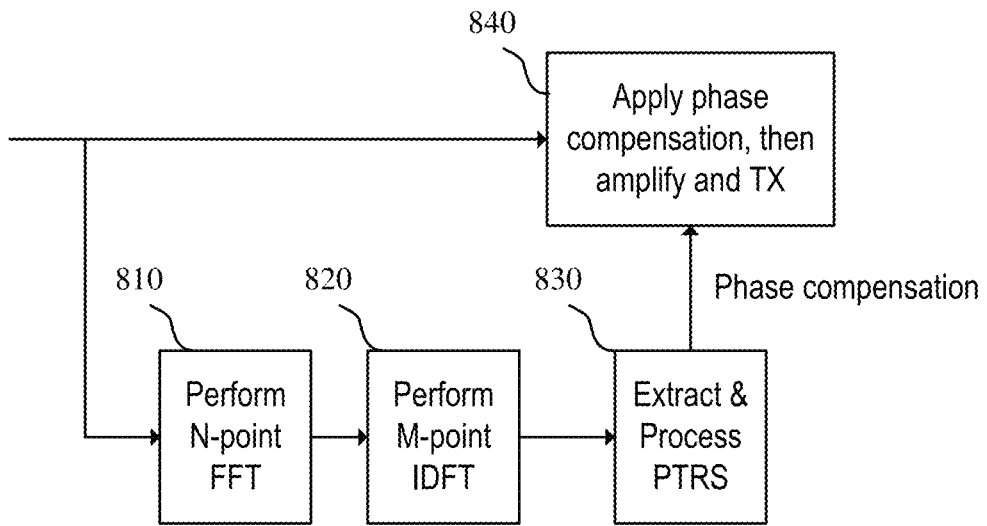
FIGS. 8A and 8B illustrate examples of PTRS processing for DFT-s-OFDM waveforms in accordance with the present disclosure.
Figure 8B:
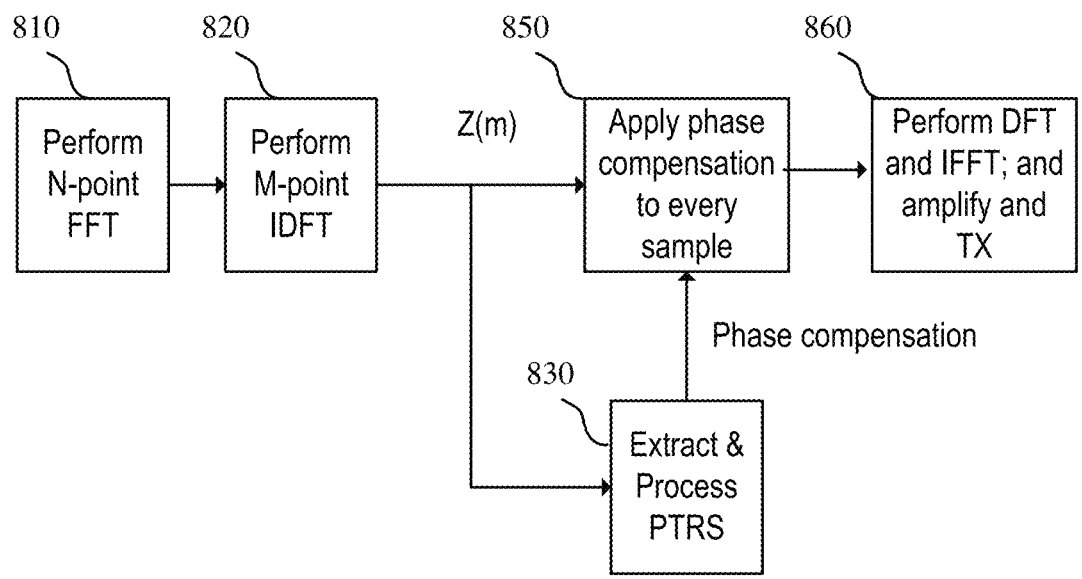

FIGS. 8A and 8B illustrate examples of PTRS processing for DFT-s-OFDM waveforms in accordance with the present disclosure. The PTRS processing illustrated in FIGS. 8A and 8B may encompass various aspects of the processing described with reference to FIG. 7.

As illustrated in FIG. 8A, a relay may perform N-point FFT 810 and afterwards M-point IDFT 820 to obtain time-domain post-IDFT samples. Knowing the PTRS pattern, the relay may extract and process PTRS at 830 to estimate phase error between samples (or in other words, compute phase compensations). At 840, the relay may apply phase compensation on the time-domain received samples, and may then amplify and transmit the phase-compensated source signal. Since the estimated phase error is with respect to the time domain samples, the phase compensation may be directly performed upon the received signal in time domain (as in 840). The time-domain direct phase compensation is also illustrated in FIG. 7.

Alternatively, the phase compensation may be applied upon post-IDFT samples as illustrated in FIG. 8B. Similarly to FIG. 8A, the relay may perform N-point FFT 810 and afterwards M-point IDFT 820 to obtain time-domain post-IDFT samples (denoted as "Z(m)"). The PTRS samples may be extracted from Z(m) and processed 830 for phase-error estimation. Since Z(m) also contain data samples, the relay may apply phase compensation 850 to the post-IDFT data samples. At 860, the relay may then regenerate DFT-s-OFDM waveform by performing DFT and IFFT, and amplify and transmit the phase-corrected source signal.

Figure 9:
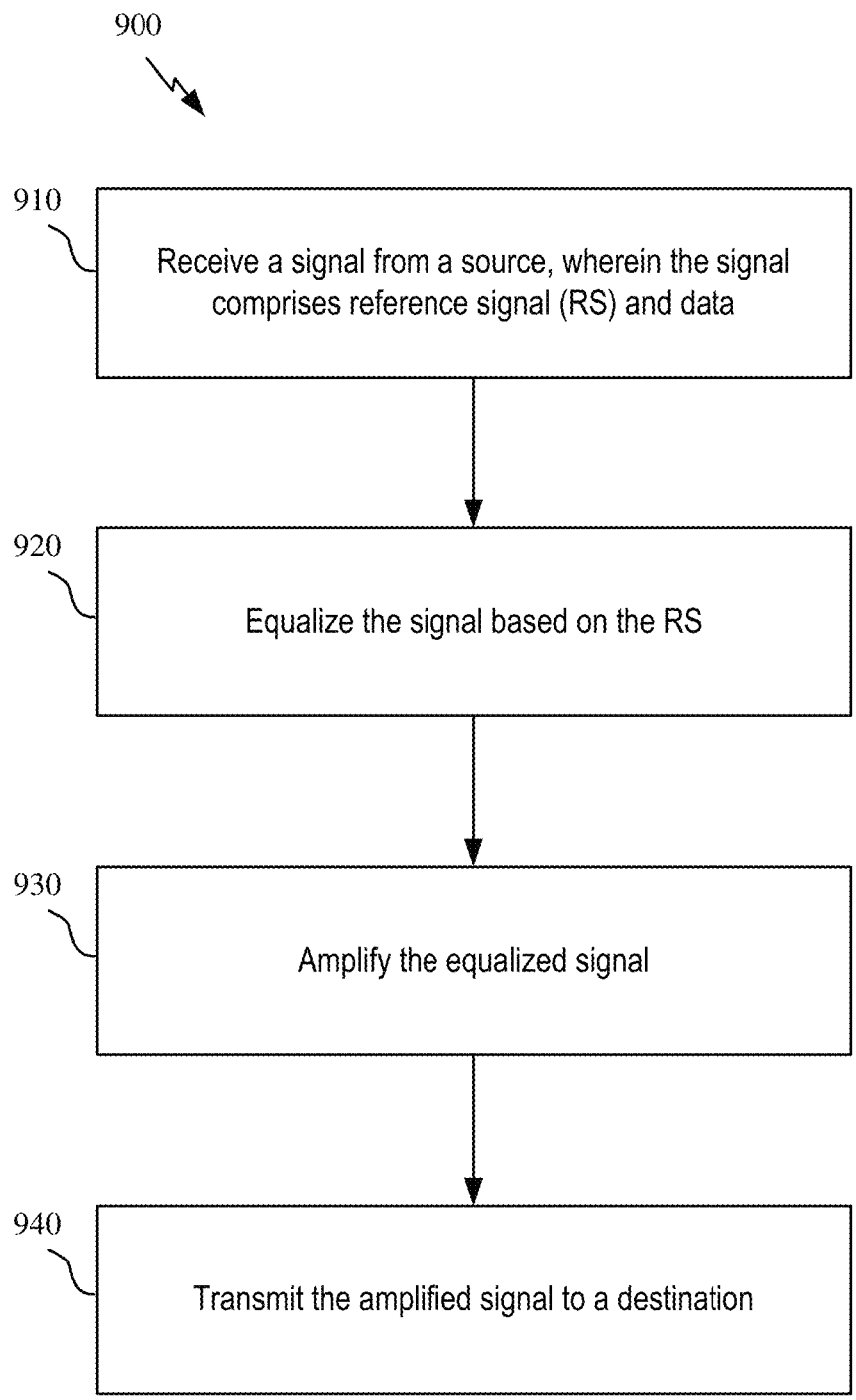
FIG. 9 illustrates an example of a method of wireless communication by a relay in accordance with the present disclosure.

FIG. 9 illustrates an example of a method 900 of wireless communication by a relay in accordance with the present disclosure. The method 900 may encompass various processing aspects of the enhanced amplify-and-forward described above. A relay may generally be any wireless communication device that relays signal/message from a source wireless communication device to a destination wireless communication device. With reference to FIG. 1, a relay may be a UE 110 relaying signal/message between a base station 120 and another UE 110. Other examples of relay may include a repeater, central processing entity, etc. A relay (or one or more of its components) may implement the method 900 using hardware, firmware, or software, or a combination thereof.

At 910, a relay may receive a signal from a source, wherein the signal may include reference signal (RS) and data. The signal may be a source signal 230 described with reference to FIG. 2. The reference signal may be demodulation reference signal (DMRS), phase tracking reference signal (PTRS), or other types of reference signal, or combinations thereof.

The relay may additionally receive a configuration of the RS from the source. The RS configuration may indicate resources, sequences, or other parameters associated with RS. Based on the received RS configuration, the relay may extract and process RS, e.g., for channel/phase-error estimation and equalization. The source, such as a base station, may transmit the RS configuration in a control message (e.g., RRC messages).

At 920, the relay may equalize the signal based on the RS. Under equalize-and-forward unlike decode-and-forward, the signal is equalized without demodulation or decoding of the data. The relay may estimate a channel or a phase based on the RS, as generally described with reference to FIGS. 2 to 8A-B. The relay may equalize the signal based on the estimated channel and/or phase-compensate the signal based on the estimated phase. As in FIG. 3, 5, or 6, DMRS may be used for channel estimation and equalization to mitigate channel distortions. Additionally, as in FIG. 4, 6, 7, or 8A-B, PTRS may be used for phase estimation and correction to mitigate phase errors. As in FIG. 4, both DMRS and PTRS may be present in the signal, and the relay may equalize the signal using both the DMRS and the PTRS for channel equalization and phase compensation.

The relay may further take advantage of waveform structures of the signal to efficiently perform RS-based signal equalization. For OFDM or SC-FDM waveforms, the relay may apply Fast Fourier Transform (FFT) to the signal to generate tone symbols, as generally described with reference to FIG. 3, 4, 7, 8A-B, either for RS processing, signal (e.g., data) equalization, or both.

After the FFT, the relay may equalize the tone symbols based on the RS. As described above, the relay may estimate channel and/or phase based on RS tone symbols corresponding to the RS. As in FIG. 3 at 350 or FIG. 4 at 450, the relay may equalize a tone symbol by multiplying the tone symbol with a conjugate of a channel or phase estimate based on the RS. After equalization in the tone domain, the relay may apply Inverse FFT (IFFT) to the equalized tone symbols, to generate time-domain equalized signal.

For SC-FDM waveforms, the relay may further apply Inverse Discrete Fourier Transform (IDFT) to a subset of tone symbols to extract RS samples, e.g., as described with reference to FIG. 8A-B. The relay may estimate a phase drift based on the RS samples. The relay may phase-compensate the signal based on the estimated phase drift. The phase-compensation may be performed on the initially received signal samples as in FIG. 8A or on the post-IDFT samples as in FIG. 8B.

Instead of performing FFT and IFFT, the relay may equalize the signal using filter banks, as described with reference to FIG. 5. The relay may filter the signal by an analysis filter bank (such as the analysis filter bank 510), which may be based on a Discrete Fourier Transform (DFT) matrix. The relay may adjust the filtered signal by weights (e.g., equalization weights 512) based on the RS. The relay may synthesize the adjusted filtered signal by an synthesis filter bank (e.g., the synthesis filter bank 514) based on an Inverse DFT matrix corresponding to the analysis filter bank.

At 930, the relay may amplify the equalized signal. The signal amplification may be achieved in baseband digital, baseband analog, and/or radio frequency domain. Generally, the power amplification may scale the equalized signal with a amplitude/power coefficient. At 940, the relay may transmit the amplified signal, as the generated relay signal, to the destination.

Furthermore, the relay may determine whether to equalize the signal based on one or more parameters. As observed in some performance simulations (e.g., FIG. 13), equalize-and-forward may not always output amplify-and-forward. The relay may choose a particular relay scheme (such as EF over AF) based on the one or more parameters. These parameters may be signaled to the relay or based on measurements or feedback of measurements. The relay may be specifically instructed or configured by the source to perform a particular relay scheme. Alternatively, the relay may autonomously determine which relay scheme to use by identifying conditions based on the one or more parameters where the particular relay scheme may likely outperform an alternative. Among the one or more parameters may be a first carrier frequency offset (CFO) between the source and the relay, and a second carrier frequency offset between the relay and the destination. According to an aspect, the relay may check whether the two CFOs are aligned in direction, and if so, choose equalize-and-forward over amplify-and-forward.

Figure 10:
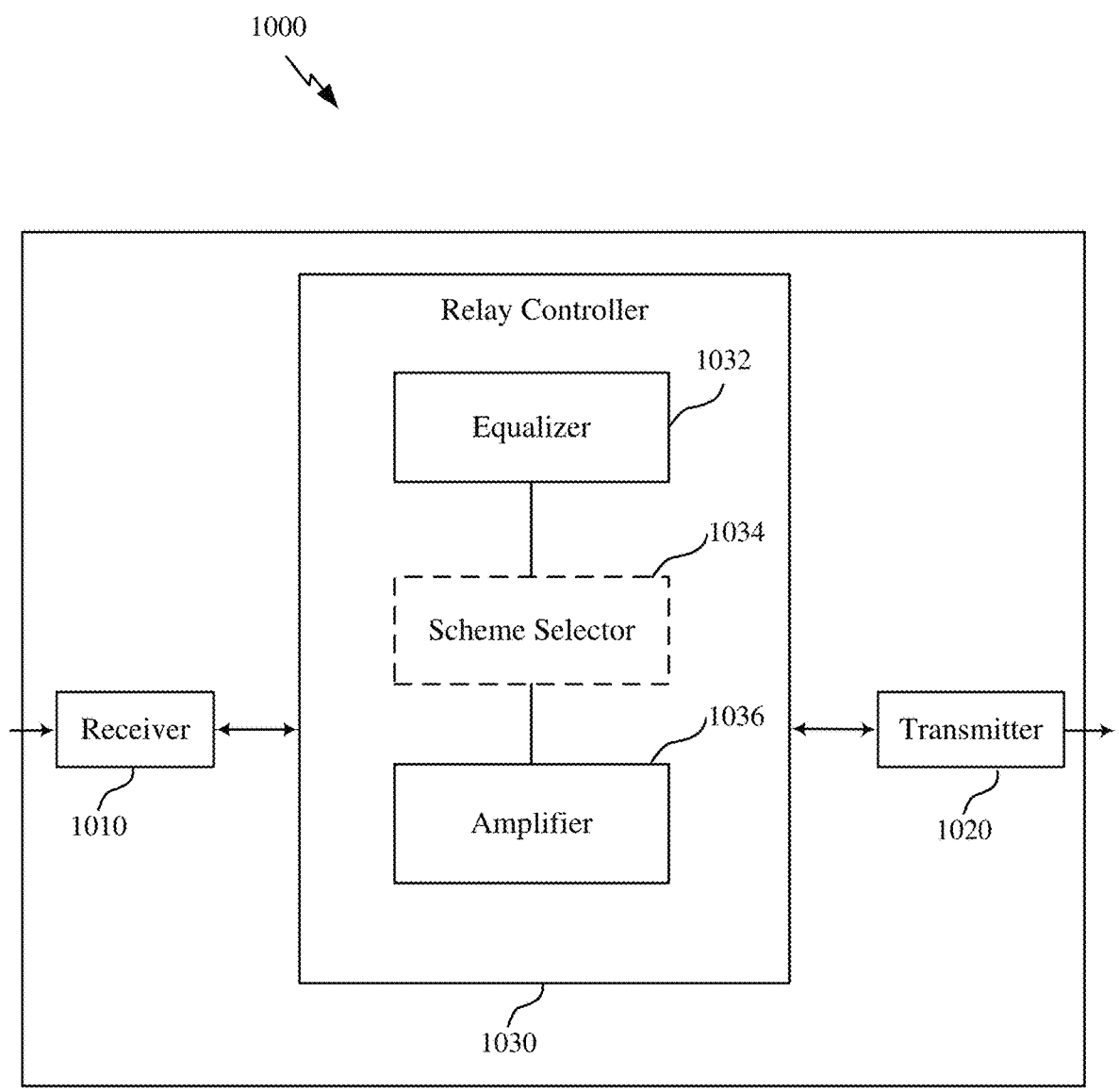
FIG. 10 illustrates an example of an apparatus of wireless communication in accordance with the present disclosure.

FIG. 10 illustrates an example of an apparatus 1000 of wireless communication in accordance with the present disclosure. The apparatus 1000 may include a receiver 1010, a transmitter 1020, and a relay controller 1030, and may perform various aspects of the method 900 described with reference to FIG. 9. The apparatus 1000 may be embodied by, or reside within a relay.

The receiver 1010 may be configured to receive, from a source, signals or channels carrying information such as packets, user data, or control information associated with various information channels. The received signal may also include one or more types of reference signals (such as DMRS or PTRS). RS and data may be passed on to other components of the apparatus. The receiver 1010 may utilize a single antenna or a set of multiple antennas.

The receiver 1010 may provide means for receiving a signal from a source, wherein the signal may include reference signal and data, and according to an aspect of the present disclosure, may be configured to perform the method 900 at 910 described with respect to FIG. 9. Besides receiving source signal containing RS, the receiver 1010 may also receive a configuration of the RS from the source.

The transmitter 1020 may be configured to transmit, to a destination, signals or channels generated by other components of the apparatus. In some examples, the transmitter 1020 may be collocated with a receiver 1010 in a transceiver module. The transmitter 1020 may utilize a single antenna or a set of multiple antennas.

The transmitter 1020 may provide means for transmitting relay signal (such as amplified signal after equalization) to the destination, and according to an aspect, may be configured to perform the method 900 at 940 described with respect to FIG. 9.

The receiver 1010 and transmitter 1020 (or a transceiver incorporating both) may be coupled to the relay controller 1030 and may provide means for communication between the apparatus 1000 with the source and with the destination.

The relay controller 1030 may be a baseband modem or an application processor or may illustrate aspects of a baseband or application processor. The relay controller 1030 or at least some of its various sub-components may be implemented in hardware, software executed by a processor, firmware, or any combination thereof. Software may comprise codes or instructions stored in a memory or like medium that is connected or in communication with the processor described above. The codes or instructions may cause the processor, the apparatus 1000, or one or more components thereof to perform various functions described herein.

The relay controller 1030 may control, coordinate, or execute various functions supporting enhancement for amplify-and-forward relay. The relay controller 1030 may further include an equalizer 1032, an (optional) scheme selector 1034, and an amplifier 1036.

The equalizer 1032 may provide means for equalizing the signal based on reference signal, and according to an aspect, may be configured to perform the method 900 at 920 described with reference to FIG. 9. Under equalize-and-forward, unlike decode-and-forward, the signal is equalized without demodulation or decoding of the data. A channel or a phase may be estimated based on the RS, as generally described with reference to FIGS. 2 to 8A-B. The equalizer 1032 may equalize the signal based on the estimated channel and/or phase-compensate the signal based on the estimated phase. DMRS and/or PTRS may be used for equalization to mitigate channel distortions and/or phase errors. The equalizer 1032 may apply FFT to the signal to generate tone symbols, as generally described with reference to FIG. 3, 4, 7, 8A-B, either for RS processing, signal (e.g., data) equalization, or both. After the FFT, the equalizer 1032 may equalize the tone symbols based on the RS. According to an aspect, the equalizer 1032 may equalize a tone symbol by multiplying the tone symbol with a conjugate of a channel or phase estimate based on the RS. After equalization in the tone domain, the equalizer 1032 may apply IFFT to the equalized tone symbols, to generate time-domain equalized signal.

For SC-FDM waveforms, the equalizer 1032 may further apply Inverse Discrete Fourier Transform (IDFT) to a subset of tone symbols to extract RS samples, e.g., as described with reference to FIG. 8A-B. A phase drift may be estimated based on the RS samples, and the equalizer 1032 may phase-compensate the signal based on the estimated phase drift. The phase-compensation may be performed on the initially received signal samples as in FIG. 8A or on the post-IDFT samples as in FIG. 8B.

Instead of performing FFT and IFFT, the equalizer 1032 may be based on filter banks, as described with reference to FIG. 5. The equalizer 1032 may filter the signal by an analysis filter bank (such as the analysis filter bank 510), which may be based on a Discrete Fourier Transform (DFT) matrix. The equalizer 1032 may adjust the filtered signal by weights (e.g., equalization weights 512) based on the RS. The equalizer 1032 may synthesize the adjusted filtered signal by an synthesis filter bank (e.g., the synthesis filter bank 514) based on an Inverse DFT matrix corresponding to the analysis filter bank.

The amplifier 1036 may provide means for amplifying the (equalized) signal, and according to an aspect, may be configured to perform the method 900 at 930 described with reference to FIG. 9.

The relay controller 1030 may optionally include the scheme selector 1034, which may determine or select a particular relay scheme (such as EF, AF, or DF) to be used. The scheme selector 1034 may determine whether to equalize the signal based on one or more parameters. If equalization is not to be performed, the received source signal may bypass the equalizer 1032 and be amplified by the amplifier 1036 as in amplify-and-forward. Otherwise (if equalization is to be performed), the received signal may be equalized by the equalizer 1032 before being amplified by the amplifier 1036.

Figure 11:
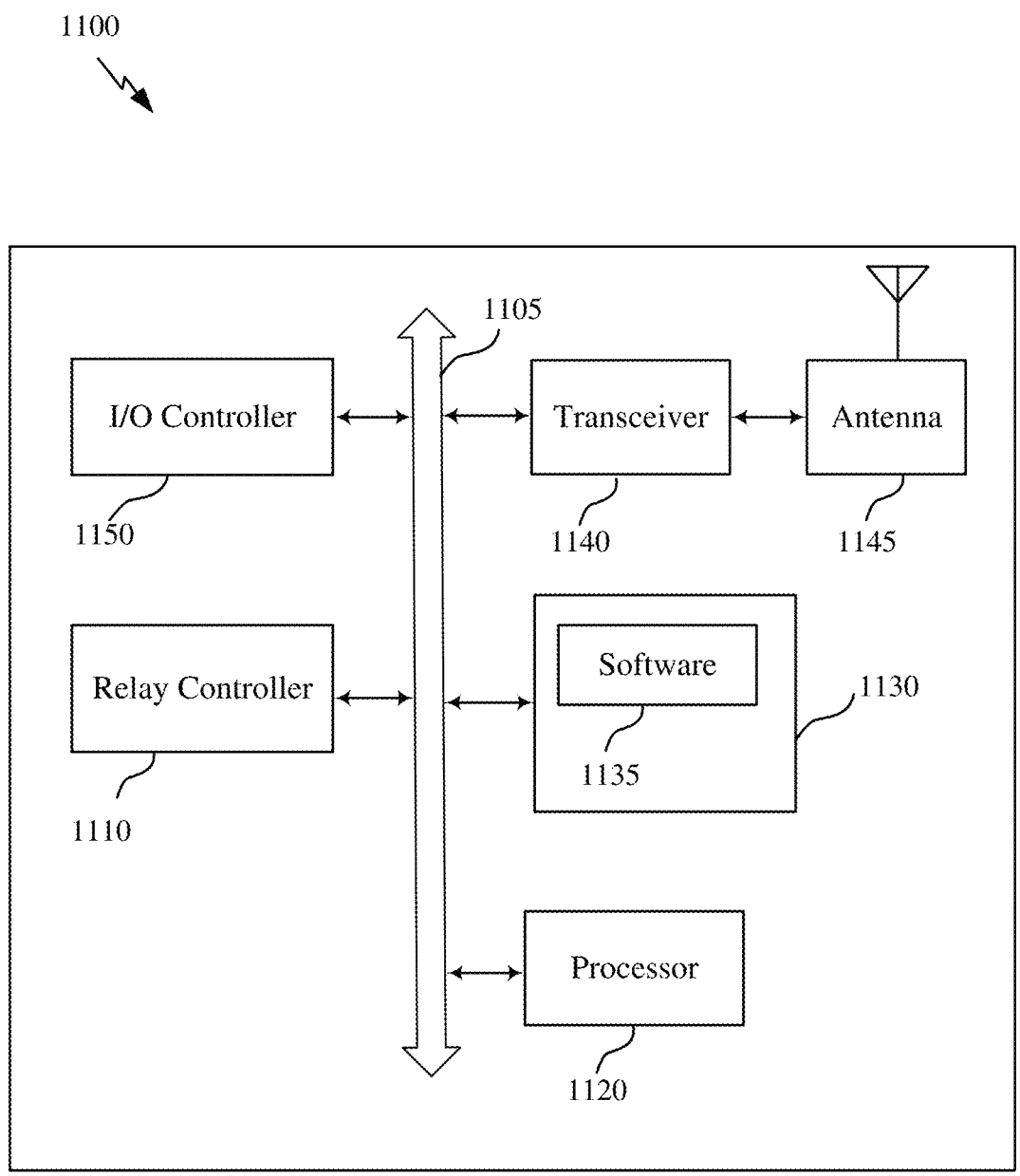
FIG. 11 illustrates an example of a relay in accordance with the present disclosure.

FIG. 11 illustrates an example of a relay 1100 in accordance with the present disclosure. The relay 1100 may be an example of a UE 110 in FIG. 1 or components thereof, which may embody various aspects of the apparatus 1000 described with reference to FIG. 10. The relay 1100 may comprise relay controller 1110, processor 1120, memory 1130, software 1135, transceiver 1140, antenna 1145, and I/O controller 1150. These components may be coupled or in electronic communication via one or more buses (e.g., bus 1105). The relay 1100 may communicate wirelessly with a source wireless communication device and with a destination wireless communication device.

The relay controller 1110 may perform various functions supporting enhancement for amplify-and-forward relay. According to an aspect of the present disclosure, the relay controller 1110 may be configured to receive a signal from a source, wherein the signal comprises reference signal (RS) and data; to equalize the signal based on the RS; to amplify the equalized signal; and to transmit the amplified signal to a destination. In some respects, the relay controller 1110 may implement the relay controller 1030 described with reference to FIG. 10. Generally speaking, the relay controller 1110 may utilize processor 1120 and memory 1130 to execute its functionalities.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions (e.g., software 1135) stored in a memory (e.g., memory 1130) to perform various functions.

Memory 1130 may include random access memory (RAM) and/or read only memory (ROM). In some cases, the memory 1130 may contain, among other things, a basic input/output system (BIOS) which may control basic hardware or software operation such as the interaction with peripheral components or devices. The memory 1130 may store computer-readable, computer-executable software 1135 including instructions that, when executed, cause the processor 1120 (or the relay 1100 generally) to perform various functions described herein.

Software 1135 may include codes implementing aspects of the present disclosure, e.g., described with reference to FIGS. 9 and 10. According to an aspect, the software 1135 may include codes for receiving a signal from a source, wherein the signal comprises reference signal (RS) and data; equalizing the signal based on the RS; amplifying the equalized signal; and transmitting the amplified signal to a destination. Software 1135 may be stored in a non-transitory computer-readable medium such as system memory or other memory. In some cases, the software 1135 may not be directly executable by the processor but may cause a computer (e.g., when compiled and executed) to perform functions described herein.

Transceiver 1140 may communicate bi-directionally, via one or more antennas, wired, or wireless links as described above. According to an aspect, the transceiver 1140 may represent a wireless transceiver and may communicate bi-directionally with another wireless transceiver. The transceiver 1140 may also include a modem to modulate the packets and provide the modulated packets to the antennas for transmission, and to demodulate packets from signals received from the antennas. In some examples, the transceiver 1140 may include both the receiver 1010 and the transmitter 1020 described with reference to FIG. 10.

In some cases, the wireless device may include a single antenna 1145. However, in some cases the device may have more than one antenna 1145, which may be capable of concurrently transmitting or receiving multiple wireless transmissions.

I/O controller 1150 may manage input and output signals for the relay 1100. I/O controller 1150 may also manage peripherals not integrated into the relay 1100. In some cases, I/O controller 1150 may represent a physical connection or port to an external peripheral. In some cases, I/O controller 1150 may utilize an operating system such as iOS®, ANDROID®, MS-DOS®, MS-WINDOWS®, OS/2®, UNIX®, LINUX®, or another known operating system. In other cases, I/O controller 1150 may represent or interact with a modem, a keyboard, a mouse, a touchscreen, or other device. In some cases, I/O controller 1150 may be implemented as part of a processor. In some cases, a user may interact with the relay 1100 via I/O controller 1150 or via hardware components controlled by I/O controller 1150.

Figure 12:
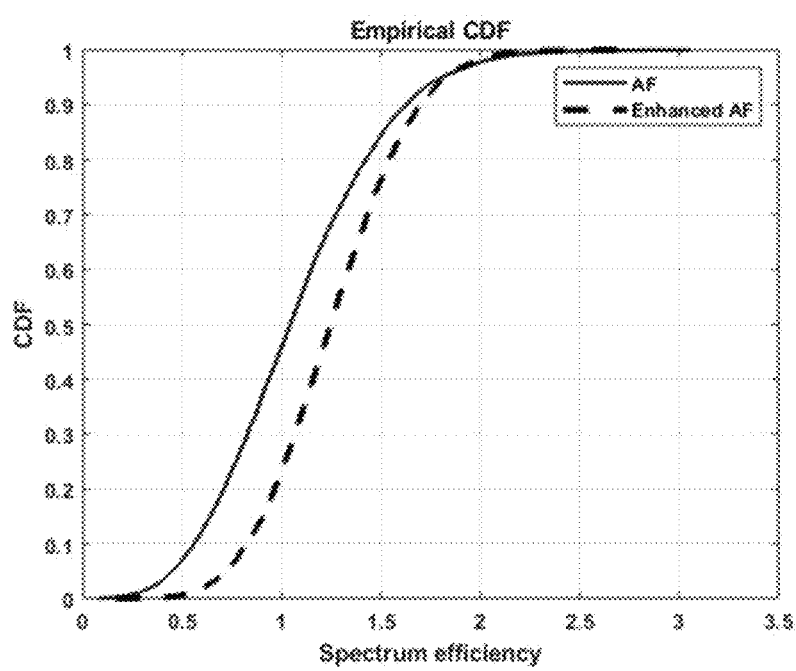
FIG. 12 illustrates performance of enhanced amplify-and-forward based on DMRS in accordance with the present disclosure.

FIG. 12 illustrates performance of enhanced amplify-and-forward based on DMRS in accordance with the present disclosure. Amplify-and-forward serves as a baseline for performance comparison. FIG. 12 plots the empirical cumulative distribution function (CDF) of spectrum efficiency corresponding to AF and EF scheme respectively. As shown in the figure, the enhanced AF achieves better rates or spectrum efficiency than the AF, especially in the tail of distribution. Simulations assume 10-tone, independently identical distribution (IID) Rayleigh fading for both the first (source-to-relay) and the second (relay-to-destination) hops. The first hop has 20 decibel (dB) channel SNR and the second hop 5 dB. The EF (enhanced AF) assumes perfect knowledge of the first hop channel (e.g., ideal channel estimation based on DMRS) and performs equalization of channel inversion. The output power of the relay is kept the same for both AF and EF for a fair comparison.

Figure 13:
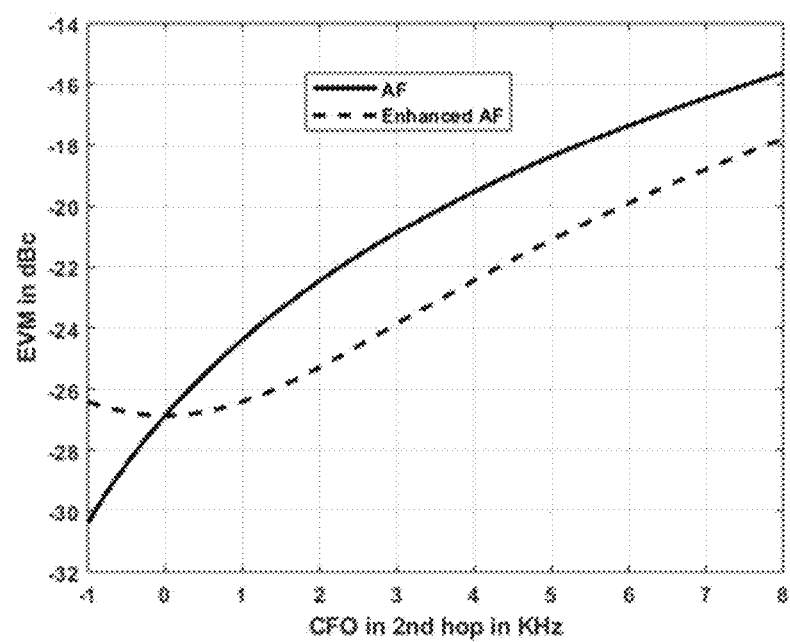
FIG. 13 illustrates performance of enhanced amplify-and-forward based on PTRS in accordance with the present disclosure.

FIG. 13 illustrates performance of enhanced amplify-and-forward based on PTRS in accordance with the present disclosure. Simulations assume the first hop (source-to-relay) has a fixed 3 KHz (kilohertz) carrier frequency offset (CFO) between the source and the relay. The error vector magnitude (EVM) is plotted as a function of the CFO in the second hop between the relay and the destination. A negative CFO means the CFO on the second hop cancels the CFO in the first hop. While AF passes the received analog signal without phase correction, the EF (enhanced AF) estimates common phase error based on PTRS and compensates common phase error before transmitting the signal to the destination UE.

As shown in the figure, the enhanced AF achieves about 2 dB gain over AF when the directions of CFO at both hops are aligned. A crossover point is observed at the CFO of the second hop equals 0 KHz, and beyond the crossover point (when the second hop CFO becomes negative), the performance of enhanced AF degrades. When the CFO of the hop has an opposite sign to the CFO of the first hop, the destination may be more frequency aligned with the source than the relay is. In such case, directly passing through the source signal (as in AF) to the destination may be a better strategy than attempting to equalize the source signal by the relay. The relay may determine whether to equalize, such as checking whether CFOs are aligned in direction at both hops, and apply EF when it may be more advantageous than AF.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, the conjunction "or" shall generally be interpreted as "inclusive" unless the context indicates otherwise. For example, "A or B" would generally mean "either A, or B, or both" (but not necessarily "either A, or B, but not both"); in other words, the presented alternatives ("A" and "B") need not necessarily be mutually exclusive. Certain context, however, can indicate an "exclusive or," as in "whether A or not," for example.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include random access memory (RAM), read-only memory (ROM), electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of wireless communication at a relay, comprising:
   receiving a signal from a source, wherein the signal comprises reference signal (RS) and data;
   applying Fast Fourier Transform (FFT) to the signal to generate RS symbols including the RS and data symbols including the data;
   determining to equalize the signal based on a first carrier frequency offset and a second carrier frequency offset being aligned in direction, the first carrier frequency offset being between the source and the relay, the second carrier frequency offset being between the relay and a destination;
   equalizing the signal based on the RS and the data, wherein the RS is used for equalization based on the RS symbols including the RS being input to an RS extraction module, the data is used for equalization without the data symbols including the data being input to the RS extraction module, and equalizing the signal includes equalizing the data symbols and the RS symbols;
   amplifying the equalized signal; and
   transmitting the amplified signal to the destination.

2. The method of claim 1, further comprising:
   receiving a configuration of the RS from the source.

3. The method of claim 1, wherein said equalizing the signal comprises:
   estimating a channel or a phase based on the RS.

4. The method of claim 1, wherein said equalizing the signal further comprises:
   equalizing tone symbols based on the RS; and
   applying Inverse FFT (IFFT) to the equalized tone symbols.

5. The method of claim 1, wherein said equalizing the signal further comprises:
   applying Inverse Discrete Fourier Transform (IDFT) to a subset of tone symbols to extract RS samples;
   estimating a phase drift based on the RS samples; and
   phase-compensating the signal based on the estimated phase drift.

6. The method of claim 1, wherein said equalizing the signal comprises:
   filtering the signal by an analysis filter bank based on a Discrete Fourier Transform (DFT) matrix;
   adjusting the filtered signal by weights based on the RS; and
   synthesizing the adjusted filtered signal by a synthesis filter bank based on an Inverse DFT matrix corresponding to the analysis filter bank.

7. The method of claim 1, wherein the signal is equalized without demodulation or decoding of the data.

8. A relay, comprising:
   a receiver configured to receive a signal from a source, wherein the signal comprises reference signal (RS) and data;
   a module configured to apply a Fast Fourier Transform (FFT) to the signal to generate RS symbols including the RS and data symbols including the data;
   a scheme selector configured to determine to equalize the signal based on a first carrier frequency offset and a second carrier frequency offset being aligned in direction, the first carrier frequency offset being between the source and the relay, the second carrier frequency offset being between the relay and a destination;
   an equalizer configured to equalize the signal based on the RS and the data, wherein the RS is used for equalization based on the RS symbols including the RS being input to an RS extraction module, the data is used for equalization without the data symbols including the data being input to the RS extraction module, and to equalize the signal, the equalizer is configured to equalize the data symbols and the RS symbols;
   an amplifier configured to amplify the equalized signal; and
   a transmitter configured to transmit the amplified signal to the destination.

9. The relay of claim 8, wherein the receiver is further configured to:
   receive a configuration of the RS from the source.

10. The relay of claim 8, wherein the equalizer is configured to:
    estimate a channel or a phase based on the RS.

11. The relay of claim 8, wherein the equalizer is further configured to:
    equalize tone symbols based on the RS; and
    apply Inverse FFT (IFFT) to the equalized tone symbols.

12. The relay of claim 8, wherein the equalizer is further configured to:
    apply Inverse Discrete Fourier Transform (IDFT) to a subset of tone symbols to extract RS samples;
    estimate a phase drift based on the RS samples; and
    phase-compensate the signal based on the estimated phase drift.

13. The relay of claim 8, wherein the equalizer is configured to:
    filter the signal by an analysis filter bank based on a Discrete Fourier Transform (DFT) matrix;
    adjust the filtered signal by weights based on the RS; and
    synthesize the adjusted filtered signal by a synthesis filter bank based on an Inverse DFT matrix corresponding to the analysis filter bank.

14. The relay of claim 8, wherein the signal is equalized without demodulation or decoding of the data.

15. An apparatus for wireless communication, comprising:
    means for receiving a signal from a source, wherein the signal comprises reference signal (RS) and data;
    means for applying Fast Fourier Transform (FFT) to the signal to generate RS symbols including the RS and data symbols including the data;
    means for determining to equalize the signal based on a first carrier frequency offset and a second carrier frequency offset being aligned in direction, the first carrier frequency offset being between the source and a relay, the second carrier frequency offset being between the relay and a destination;
    means for equalizing the signal based on the RS and the data, wherein the RS is used for equalization based on the RS symbols including the RS being input to an RS extraction module, the data is used for equalization without the data symbols including the data being input to the RS extraction module, and the means for equalizing the signal is configured to equalize the data symbols and the RS symbols;
    means for amplifying the equalized signal; and
    means for transmitting the amplified signal to the destination.

16. The apparatus of claim 15, further comprising:
means for receiving a configuration of the RS from the source.

17. The apparatus of claim 15, wherein the means for equalizing the signal is further configured to:
estimate a channel or a phase based on the RS.

18. The apparatus of claim 15, wherein the means for equalizing the signal is further configured to:
equalize tone symbols based on the RS; and
apply Inverse FFT (IFFT) to the equalized tone symbols.

19. The apparatus of claim 15, wherein the means for equalizing the signal is further configured to:
apply Inverse Discrete Fourier Transform (IDFT) to a subset of tone symbols to extract RS samples;
estimate a phase drift based on the RS samples; and
phase-compensate the signal based on the estimated phase drift.

20. The apparatus of claim 15, wherein the means for equalizing the signal is further configured to:
filter the signal by an analysis filter bank based on a Discrete Fourier Transform (DFT) matrix;
adjust the filtered signal by weights based on the RS; and
synthesize the adjusted filtered signal by a synthesis filter bank based on an Inverse DFT matrix corresponding to the analysis filter bank.

21. A non-transitory computer-readable medium having instructions stored thereon, the instructions comprising code executable for a relay to:
receive a signal from a source, wherein the signal comprises reference signal (RS) and data;
apply Fast Fourier Transform (FFT) to the signal to generate RS symbols including the RS and data symbols including the data;
determine to equalize the signal based on a first carrier frequency offset and a second carrier frequency offset being aligned in direction, the first carrier frequency offset being between the source and the relay, the second carrier frequency offset being between the relay and a destination;
equalize the signal based on the RS and the data, wherein the RS is used for equalization based on the RS symbols including the RS being input to an RS extraction module, the data is used for equalization without the data symbols including the data being input to the RS extraction module, and to equalize the signal, the code executable for the relay is to equalize the data symbols and the RS symbols;
amplify the equalized signal; and
transmit the amplified signal to the destination.

* * * * *